(12) United States Patent
Li et al.

(10) Patent No.: US 10,979,335 B2
(45) Date of Patent: Apr. 13, 2021

(54) NETWORK LINK PERFORMANCE

(71) Applicant: SOLARWINDS WORLDWIDE, LLC, Austin, TX (US)

(72) Inventors: Na Li, Austin, TX (US); Lan Li, Austin, TX (US)

(73) Assignee: SOLARWINDS WORLDWIDE, LLC, Austin, TX (US)

( * ) Notice: Subject to any disclaimer, the term of this patent is extended or adjusted under 35 U.S.C. 154(b) by 92 days.

(21) Appl. No.: 15/417,978

(22) Filed: Jan. 27, 2017

(65) Prior Publication Data
US 2018/0219760 A1 Aug. 2, 2018

(51) Int. Cl.
*H04L 12/26* (2006.01)
(52) U.S. Cl.
CPC ............ *H04L 43/10* (2013.01); *H04L 43/087* (2013.01); *H04L 43/0829* (2013.01)
(58) Field of Classification Search
CPC ................................. H04L 43/10; H04L 12/26
See application file for complete search history.

(56) References Cited

U.S. PATENT DOCUMENTS

| | | | |
|---|---|---|---|
| 2003/0096606 A1* | 5/2003 | Inman .................. | H04L 41/142 455/424 |
| 2006/0153174 A1* | 7/2006 | Towns-von Stauber ..................... | H04L 65/80 370/356 |
| 2006/0182034 A1* | 8/2006 | Klinker .................. | H04L 43/00 370/238 |
| 2011/0085450 A1* | 4/2011 | Jeyachandran ......... | H04L 41/12 370/248 |
| 2015/0071096 A1* | 3/2015 | Hayden ............... | H04L 43/0835 370/252 |

* cited by examiner

*Primary Examiner* — Nicholas P Celani
(74) *Attorney, Agent, or Firm* — Squire Patton Boggs (US) LLP

(57) ABSTRACT

An apparatus and method for the monitoring of performance metrics at links located within the communication network. A method may include discovering multiple paths across a plurality of nodes in a network between a user equipment and an endpoint. The method may also include deriving at the user equipment performance metrics of an edge located between two of the plurality of nodes. The performance metrics is derived based on performance of the two nodes bordering the edge. The two nodes are located within one of the multiple paths.

17 Claims, 6 Drawing Sheets

350

| SP | LP1 | LP2 | Actual Packet Loss | Simplified Packet Loss | Error of Simplified Calculation |
|---|---|---|---|---|---|
| 20 | 1 | 2 | 5.263% | 5.000% | 5.00% |
| 20 | 2 | 3 | 5.556% | 5.000% | 10.00% |
| 20 | 3 | 4 | 5.882% | 5.000% | 15.00% |
| 20 | 4 | 5 | 6.250% | 5.000% | 20.00% |
| 20 | 5 | 6 | 6.667% | 5.000% | 25.00% |
| 20 | 6 | 7 | 7.143% | 5.000% | 30.00% |
| 20 | 7 | 8 | 7.692% | 5.000% | 35.00% |
| 20 | 8 | 9 | 8.333% | 5.000% | 40.00% |
| 20 | 9 | 10 | 9.091% | 5.000% | 45.00% |

Figure 3A

NETWORK LINK PERFORMANCE

BACKGROUND

Field

Various embodiments pertain to a communication network. In particular, various embodiments relate to the monitoring of performance metrics at links located within the communication network.

Description of the Related Art

Given the complicated nature of modern communication systems, it is often difficult to detect and fix performance issues within a network. At least part of the difficulty is derived from the challenges related to determining the origin of a performance issue. In one example, a user equipment can attempt to gain access to a server within the network, and may experience a performance issue. Before the performance issue can be solved, the origin of the problem must first be determined. The problem, however, may reside in the user equipment itself, the server with which the user equipment is attempting to connect, and/or any other network entity that resides between the user equipment and the server.

Even if the user equipment rules itself out as a possible cause of the performance issue, it is still a challenge to pinpoint where in the network the problem originates. This challenge becomes particularly problematic when the user equipment does not have administrative access to all parts of the network with which the user equipment communicates in order to connect to the server. It is therefore difficult for the user equipment to find the source of the performance issue within the network, especially when the user equipment is not able to gain access to various administrative information of a given network.

SUMMARY

A method, in certain embodiments, may include discovering multiple paths across a plurality of nodes in a network between a user equipment and an endpoint. The method may also include deriving at the user equipment performance metrics of an edge located between two of the plurality of nodes. The performance metrics is derived based on performance of the two nodes bordering the edge. The two nodes are located within one of the multiple paths.

According to certain embodiments, an apparatus may include at least one memory including computer program code, and at least one processor. The at least one memory and the computer program code may be configured, with the at least one processor, to cause the apparatus at least to discover multiple paths across a plurality of nodes in a network between a user equipment and an endpoint. The at least one memory and the computer program code may also be configured, with the at least one processor, at least to deriving at the user equipment performance metrics of an edge located between two of the plurality of nodes. The performance metrics is derived based on performance of the two nodes bordering the edge. The two nodes are located within one of the multiple paths.

An apparatus, in certain embodiments, may include means for discovering multiple paths across a plurality of nodes in a network between a user equipment and an endpoint. The apparatus may also include means for deriving at the user equipment performance metrics of an edge located between two of the plurality of nodes. The performance metrics is derived based on performance of the two nodes bordering the edge. The two nodes are located within one of the multiple paths.

According to certain embodiments, a non-transitory computer-readable medium encoding instructions that, when executed in hardware, perform a process. The process may include discovering multiple paths across a plurality of nodes in a network between a user equipment and an endpoint. The process may also include deriving at the user equipment performance metrics of an edge located between two of the plurality of nodes. The performance metrics is derived based on performance of the two nodes bordering the edge. The two nodes are located within one of the multiple paths.

According to certain embodiments, a computer program product encoding instructions for performing a process according to a method including discovering multiple paths across a plurality of nodes in a network between a user equipment and an endpoint. The method may also include deriving at the user equipment performance metrics of an edge located between two of the plurality of nodes. The performance metrics is derived based on performance of the two nodes bordering the edge. The two nodes are located within one of the multiple paths.

BRIEF DESCRIPTION OF THE DRAWINGS proper understanding of the invention, reference should be made to the accompanying drawings, wherein:

FIG. 3A illustrates a table according to certain embodiments.

DETAILED DESCRIPTION

Figure 1:
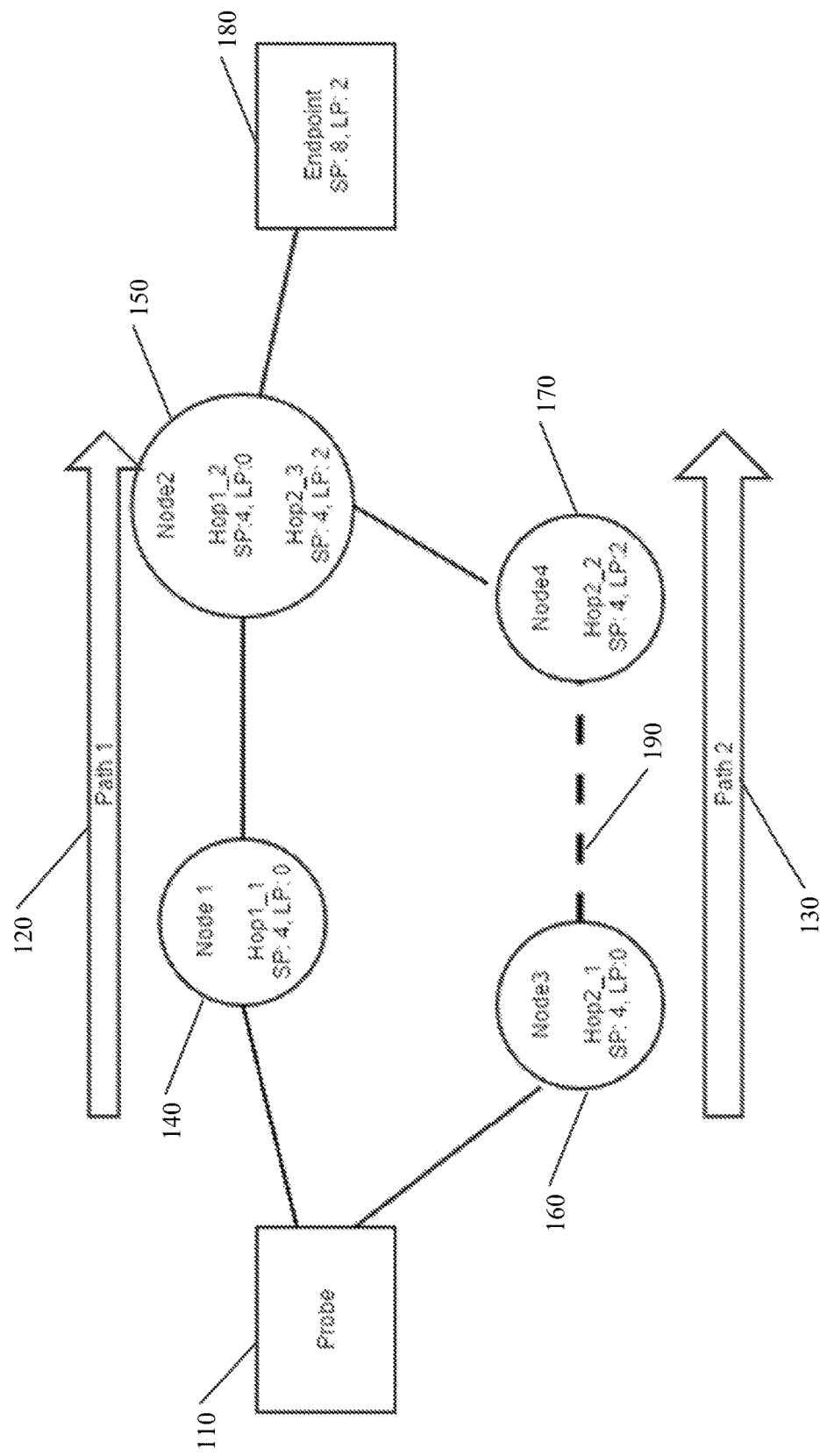
FIG. 1 illustrates a system according to certain embodiments.

Certain embodiments may allow for a user equipment communicating with the network to be able to detect the source of a performance issue. A user equipment may be a mobile station, such as a mobile phone or smart phone or multimedia device, and/or a computer, such as a tablet, personal computer, or a laptop computer, provided with wireless communication capabilities. In particular, certain embodiments allow a user equipment to determine a location of a network entity located within the network that may be causing the performance issue of a particular service to which the user equipment is attempting to gain access or use. In order to identify the location and/or isolate the cause of the problem, the user equipment may utilize edge metrics. An edge may be a communication link located between two or more nodes within the network, and an edge metric, which may be referred to as a performance metric below, may be any measurement of performance relating to the edge. For example, a performance metric may be packet loss and/or latency.

To determine the nodes within a network, a user equipment may utilize a probe to discover multiple paths between the probe, which may be located within or operated at the user equipment, and an endpoint within the network. The performance metrics of each individual node along a given path may be measured while probing the path. Such nodes may include nodes to which the user equipment has administrative access and/or nodes to which the user equipment has no administrative access. The performance metrics of each individual node, however, depends upon the performance of all other nodes located between the probe and the individual node. Poor performance metrics at a node may therefore not be a problem with the individual node, but may be indicative of a problem in any other network node on the probed path. In some embodiments, a performance metric of an edge can be aggregated using samples from paths that share the same unique edge. Such embodiments, for example may be used when there are many possible unique paths from the probe to the endpoint, and it may be too expensive to iterate through all of the possible unique paths.

Certain embodiments may use a performance metrics of an edge, rather than the node itself, to locate and isolate the problem within the network. An edge may be identified by two consecutive nodes or hops on a path, while the node identification may be derived from traceroute node aggregation, for example. A performance metrics of the edge may indicate the performance of a specific link and the two nodes bordering the edge. In other words, a performance metrics of an edge may be able to locate a cause of the performance problem to a given link or edge, or the nodes bordering the link or edge, while limiting or excluding the contributions of other network nodes that do not border the edge. For example, poor performance metrics at an edge located between a first node, node_n, and a second node, node_(n+1), n being a number of a given node, may indicate a problem at an egress interface at node_n, the link connecting node_n, node_(n+1), and/or the ingress interface at node(n+1).

Determining the performance metrics of the edge may include at least one of path collection, smoothing performance metrics along the paths, derive edge metrics within a path, and/or aggregate edge metrics across paths.

In certain embodiments, the user equipment may detect a performance issue. To determine what entity within the network may be causing the performance issue, the user equipment may first use path collection to map the network. In some embodiments, multiple paths may be collected in order to determine at least some of the multiple paths a given transmission may take between a user equipment and an endpoint. While several embodiments discussed below may relate a traceroute probe used to discover multiple paths across a plurality of nodes in a network between a user equipment and an endpoint, any other form of path collection may be used. The information accumulated during path collection may include at least a list of hops or nodes traced between the probe to the endpoint.

In addition, some embodiments may collect information from each hop or node while mapping a given path. For example, in certain embodiments the user equipment may collect an internet protocol (IP) address of the nodes, a number of nodes or hops on a path, a latency value from the probe to a given node, a number of one or more probing packets sent to the node, and/or a value of the lost packets at the node or hop. The value of the lost packets at a given node may be the difference between the probing packets being sent to the node, and the number of packet received in response from this node. Any other information that may be useful towards determining performance of an edge or a node may be collected. The path collection may discover multiple paths, some of which may be at least partially or fully identical. For example, paths that are fully identical may be said to be the same path because the paths share the same list of nodes or hop IP addresses. In certain embodiments, instead of the same path being aggregated, two or more paths having one or more similar edges may be aggregated. Aggregating may include summing a first and a second performance metrics of an edge, and calculating the performance metrics based on a first performance metric and a second performance metric of the edge.

Certain embodiments may include smoothing of the collected performance metrics of the edges to account for packet losses and latency associated with a probing packet. Smoothing may be used in order to simulate normal traffic, such as a data packet being transmitted, as opposed to simulated traffic that includes a probing packet. In some embodiments, network nodes in between the user equipment and the endpoint, also known as middle nodes, may be measured during probing as having a higher packet loss than the endpoint.

A middle node, for example, may receive a probing packet with a time to live (TTL) value of 1, and generate an internet control message protocol (ICMP) TTL expire response. The ICMP TTL expire response may be used to evaluate the packet loss at the middle node. Because responding to the probing packet may be a low priority task, compared to other normal data packet forwarding task, the middle node may decide not to send a response to the probing packet when busy. The lack of responsiveness from the middle node is considered by the probe as a packet loss, even though the middle node may be forwarding normal data packets with minimal packet loss. The probe may then determine that the middle node experiences a higher measured packet loss than the middle node is actually experiencing. A similar embodiment may include a latency measurement, in which the probe may measure a higher latency as compared to normal traffic.

To account for the above packet losses and/or latency associated with the probing packet, a smoothing of the performance metrics may be used. Smoothing may help to bring the probing measurements closer to the measurements associated with normal traffic. In certain embodiments, the latency from a second node or hop may be equal to or larger than the latency of the first node or hop, and/or the packet loss from the second hop may be equal to or larger than the packet loss of the first hop. To smooth the collected performance metrics, probed paths which follow the same path may be grouped. Grouping the same paths may help to improve the estimation accuracy of the metrics or measurements taken on a specific path. Two or more paths may be said to be the same path if they fully share a path identification, which may be formed by the sequence of node identification from all nodes along the path.

The endpoint packet loss of a group of paths, which may be an aggregated path, may be calculated using the following equation:

$$PL = \frac{\text{SUM}(LP)}{\text{SUM}(SP)}.$$

PL represents the packet loss, LP represents the number of packets that were sent to the endpoint and for which no response is received, and SP represents the number of probing packets sent to the endpoint. PL may therefore always be smaller than or equal to one. In other words, the packet loss includes a sum of the loss packets in an aggregated path divided by the sum of the sent packets in the aggregated path. The packet loss for each hope or node in a path may be equal to or less than the packet loss of the endpoint.

In some embodiments, the latency for each hop may be calculated using the following equation:

$$\text{Aggregate Path Latency} = \frac{\text{SUM(latency of each path)}}{\text{Sample Count}}.$$

In other words, the aggregate path latency may be calculated by summing the latency measurements of each path at a given node or hop, and dividing the summed latency by the number of paths. Similar to packet loss calculation, latency measurements from the same probed paths may be aggregated. The calculation may start from the endpoint of a path, and move back to the probe while calculating latency at each hop or node between the endpoint and the user equipment. In certain embodiments, nodes belonging to the same multiprotocol label switching (MPLS) domain may have their MPLS labels extracted from the ICMP packets. Extracting the MPLS labels may help to adjust the node latency to avoid an over estimation of the latency.

Once path collection and smoothing of the performance metrics has been performed, edge metrics within a path may be derived. As previously discussed, during smoothing the same paths are aggregated in order to improve the accuracy of the performance metrics within the path. The edge performance metrics between two consecutive nodes and/or hops within the aggregated path may be calculated. In other words, the two nodes may be the entering and the exiting nodes of the edge.

FIG. 1 illustrates an example of a system according to certain embodiments. In particular, FIG. 1 illustrates two paths from probe 110 to endpoint 180. The first path 120 may include a first node 140 and a second node 150, while the second path 130 may include a third node 160, a fourth node 170, and second node 150. The paths shown in FIG. 1 may each be aggregated paths. First aggregation path 120 may have no packet loss, while second aggregation path 130 may have a fifty percent packet loss. In certain embodiments, the performance issues may be on edge 190, located between third node 160 and fourth node 170.

As can be seen in FIG. 1, fourth node 170 has a packet loss of two out of four total packets. Fourth node 170 can therefore be said to have a packet loss of fifty percent. Because second node 150 is shared between second path 130 and first path 120, the loss of packets in fourth node 170 may reflect in second node 150. As can be seen in FIG. 1, therefore, second node 150 can be shown as exhibiting a twenty five percent packet loss, while endpoint 180 is shown as having a packet loss of two out of eight packets, equaling to a twenty five percent packet loss. When evaluating the packet losses while aggregating metrics from both the first path and the second path, the two packet loss shown in second node 150 may mistakenly be attributed as a loss of packets in the edge between first node 140 and second node 150, rather than a loss of packets in the between third node 160 and fourth node 170.

To avoid packet loss of another path from influencing the performance metrics of a path, certain embodiments may derive edge metrics within the same paths. In other words, when deriving the packet loss between probe 110 and endpoint 180, certain embodiments may consider only first path 120 or second path 130. Same paths may therefore be used to calculate and determine various performance metrics, while paths including different middle nodes or hops may not be considered. In the embodiment of FIG. 1, for example, once edge metrics are derived within a given path, it may be determined that edge 190 between third node 160 and fourth node 170 may be the source of the problem.

Figure 2:
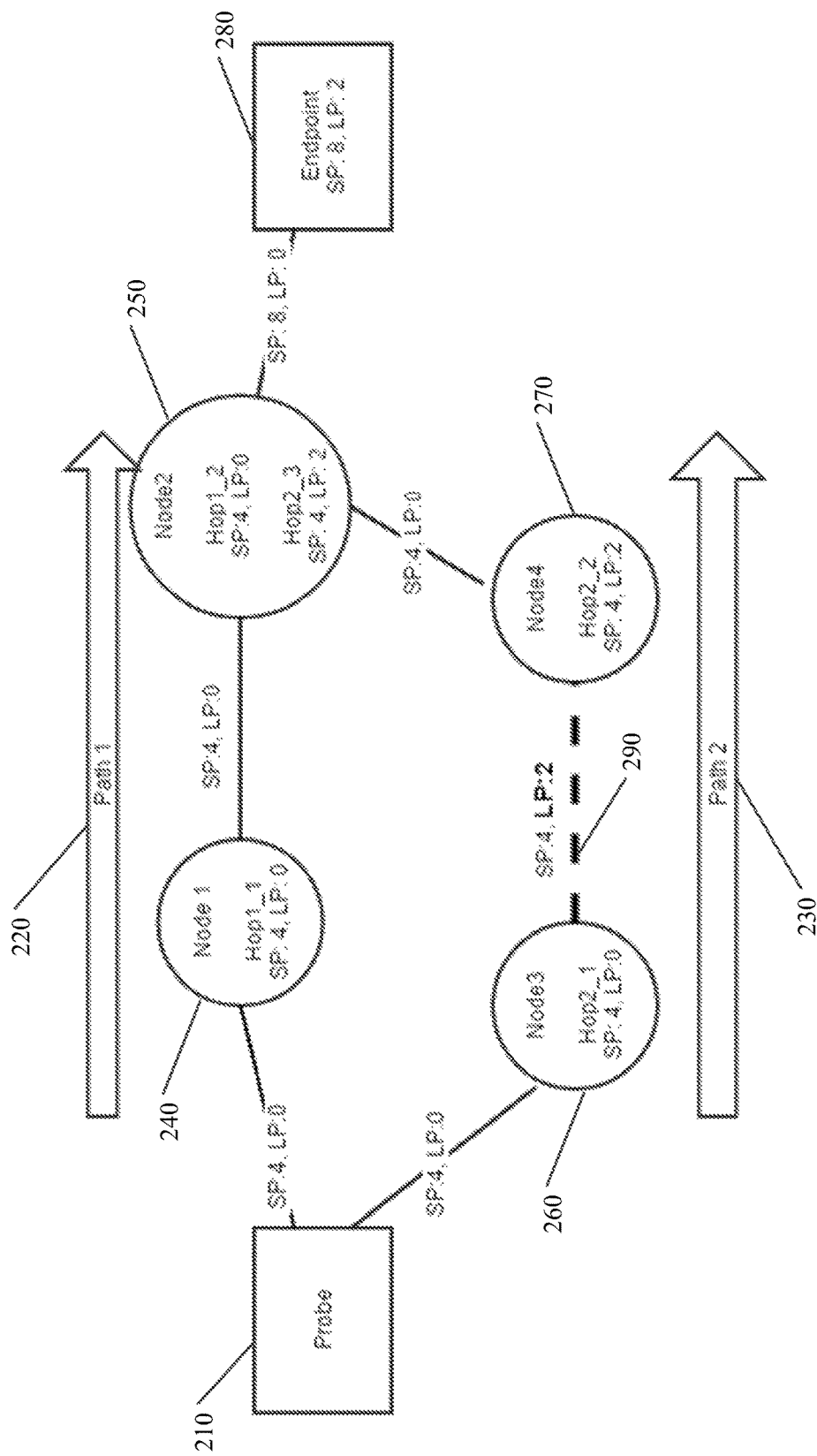
FIG. 2 illustrates a system according to certain embodiments.

FIG. 2 illustrates an example of a system according to certain embodiments. FIG. 2 illustrates two paths from probe 210 to endpoint 280. The first path 220 may include a first node 240 and a second node 250, while the second path 230 may include a third node 260, a fourth node 270, and second node 250. The measured edge packet loss may be derived based on the measured packet loss on two consecutive nodes that border the link or edge. In certain embodiments, the number of packets a first node, Node_n, receives may be equal to SP−LP_n due to packet loss between the probe and Node_n. The packet loss at first node, Node_n, may be represented by the following equation:

$$PL_n = \frac{LP_n}{SP}.$$

For example, the packet loss in fourth node 270 may be fifty percent.

The surviving packets that have not been lost, represented by SP−LP_n, are then forwarded or sent to the second node, Node_(n+1). In the embodiment of FIG. 2, two packets will be sent from fourth node 270 to second node 250. The number of packets received by second node Node_(n+1) may be represented by SP-LP_n. SP-LP_(n+1) accounts for the number of packets received between the probe and second node, Node(n+1). The packets lost at Node_(n+1) may be represented by the following equation:

$$PL_{n+1} = \frac{LP_{n+1}}{SP}.$$

The packet loss at the edge between first node, Node_n, and second node, Node_(n+1), may therefore be represented by the following equation:

$$PL_{edge\_n\_n+1} = \frac{LP_{n+1} - LP_n}{SP - LP_n}.$$

Using the above equation, it can be determined that the packet loss exhibited in edge 290, located between third node 260 and fourth node 270, may be fifty percent. The packet loss exhibited in the edge between first node 240 and second node 250, on the other hand, may be zero percent.

Figure 3:
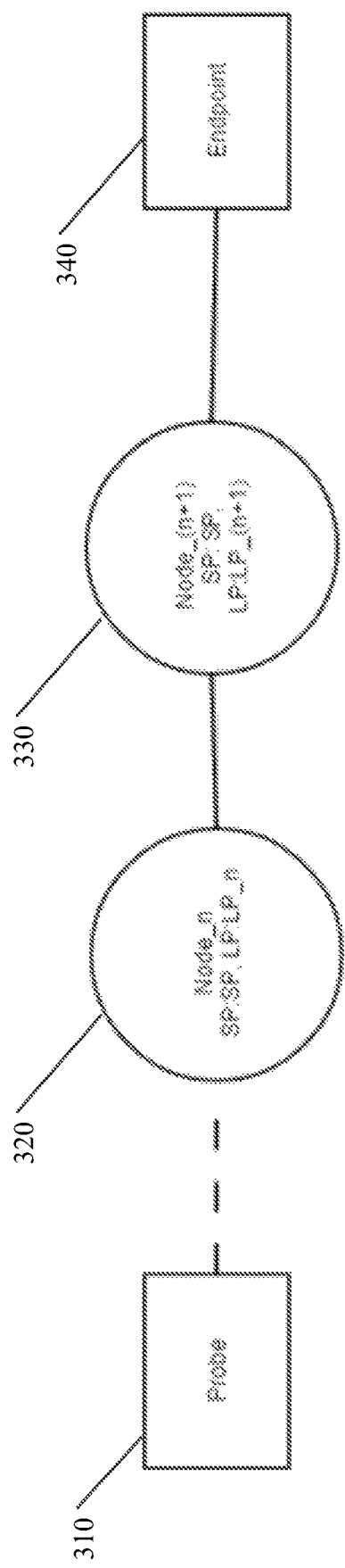
FIG. 3 illustrates a system according to certain embodiments.

FIG. 3 illustrates an example of a system according to certain embodiments. FIG. 3 illustrates two paths from probe 310 to endpoint 340. As can be seen in FIG. 3, only one path is shown which includes first node 320 and second node 330. In certain embodiments, when probing second node, Node_(n+1), the value of the lost packets in the first node may not be explicitly known. Only the value of SP and LP_(n+1) at the second node are known, but the value of LP_n may not be known. Similarly, when probing first node, Node_n, the values of SP and LP_n may only be known at the first node. The number of probing packets that do not reach second node Node_n(n+1) may also not be known, because the second node is not probed when the first node is probed. Therefore, two separate operations, one for first node Node_n 320 and another for second node Node_(n+1) 330, may be conducted in order to determine the edge metrics of a given edge or link.

In certain embodiments, the lost packets at a first node LP_n may be higher than the lost packets at the second node LP_(n+1) due to the random nature of the packet loss. In such an embodiment, packet loss may still be determined at each node bordering a given edge or according to the following equation $$PL_{edge\_n\_n+1} = \frac{LP_{n+1} - LP_n}{\text{Max }(SP - LP_n, SP - LP_{n+1})}.$$

However, packet loss in this embodiment may be negative. In some embodiments, multiple rounds of testing may be undergone, and the results may be aggregated to improve the accuracy of the metrics by adding the number of sent packets and lost packets on the edge. In some embodiments, when the aggregated packet loss may be negative, the aggregated final packet loss may be given a value of zero. The adjusted packet loss at the edge between first node Node_n and second node Node_(n+1), in which the lost packets in the first node LP_n is greater than the lost packets in the second node LP_n+1 may be represented by the following equation:

$$PL_{edge\_n\_n+1} = \frac{LP_{n+1} - LP_n}{\text{Max }(SP - LP_n, SP - LP_{n+1})}.$$

In other words, the packet loss at an edge may be determined based on the lost packets at a second node minus the lost packets of a first node, divided by the higher value or the maximum value of the remaining probe packets sent to either the first node or the second node.

For example, in a first round, 10 probe packets may be sent to first node Node_A, and the probe may receive 6 responses. 10 probe packets may then be sent to a second node Node_B, and the probe may receive 8 responses. The derived edge packet loss in the first round may therefore be negative twenty five percent, since −2 packets are lost and 8 packets are responded to on the edge. In a sound round, 10 probe packets may be sent to Node_A, and the probe may receive 8 responses. 10 probe packets may then be sent to Node_B, and the probe may receive 6 responses. The derived edge packet loss in the second round may therefore be twenty five percent, since 2 packets are lost and 8 packets are responded to on the edge. The aggregated edge packet loss between Node_A and Node_B may therefore be zero percent. The aggregated edge packet loss between the probe and first Node_A is thirty percent. Therefore, the edge between the probe and first Node_A has a performance issue that causes packet loss.

The aggregated packet loss at each node bordering an edge, however, may in certain embodiments be individually determined, rather than attempting to aggregate the edge packet loss of the link itself. The aggregated packet loss of Node_A may be thirty percent, since 6 packets total were lost and 20 packets were sent by the probe. The aggregated packet loss of Node_B may also be thirty percent, since similarly 6 packets total were lost and 20 packets were sent by the probe. As such, the total packet loss of the edge, which Node_A and Node_B border, may be zero percent. In certain embodiments, the edge metrics from the nodes are derived from within the same path, and may be aggregated across multiple paths.

In certain embodiments, the equation for deriving packet loss at an edge may be scaled. For example, in a first round a probe may send out 10 request packets, and receive 5 response packets from first node Node_n. In a second round a probe may send out 20 request packets, and receive 10 packets from second node Node_(n+1). Because of the difference in the number of probe packets sent during the first and the second round, it may be helpful to scale the adjusted packet loss equation $PL_{edge\_n\_n+1}$. In other words, the first performance metrics and the second performance metrics are calculated using a different number of sent probe packets.

In certain embodiments, one example of scaling when previous packet loss is deemed lower than the total packet loss, the packet loss may be represented by the following equation:

$$PL = 1 - \frac{(1 - totalPacketLoss)}{(1 - previouspacketLoss)}.$$

On the other hand, when previous packet loss is deemed to be higher than or equal to the total packet loss, the packet loss may be represented by the following equation:

$$PL = \frac{(1 - previouspacketLoss)}{(1 - totalPacketLoss)} - 1.$$

The totalPacketloss representing the packet loss at second node Node_(n+1), may be fifty percent, and is calculated based on (20−10)/20. The previousPacketloss representing the packet lost at first node Node_n may also be fifty percent, which is calculated as follows: (10−5)/10. Given that the packet loss at second node Node_n and first node Node_(n+1) is the same, the edge packet loss at the above example is zero.

The number of probe packets sent from the probe may be arbitrary. Any number of packets may be sent from the probe to any node in the network. The number of the probe packets may be set using the following equation: Max(SP_Node_n, SP_Node_(n+1)). The number of lost packets (LP) in an edge, meaning packets to which no response is received, may be calculated using LP=SP*PL. The value of lost packets, in certain embodiments, may not be rounded up to an integer because it may introduce round up error. The cumulated error may be significant when multiple edge measurements are aggregated when calculating a final result. If the packet loss is negative due to estimation error, the packet loss may be forced to be zero after aggregation.

In certain other embodiments, another example of scaling may include finding and considering the maximum SP in both first node Node_n and second node Node_(n+1). The maximum SP may be calculated in accordance with the following equation: SP_max=Math·Max (SP_n, SP(n+1)). In such embodiments, the scale of the SP and the LP for the first node Node_n may be calculated according to the following equation:

$$SP_{modified\_n} = SP_{max}, \; LP_{modified\_n} = LP_n * \frac{SP_{max}}{SP_n}.$$

The SP and LP for the second node Node_n+1, on the other hand, may be calculated according to the following equation:

$$SP_{modified\_n+1} = SP_{max'}, \quad LP_{modified\_n+1} = LP_{n+1} * \frac{SP_{max}}{SP_{n+1}}.$$

The packet loss using the above modified lost packets and sent packets may calculated according to the following equation:

$$PL_{edge\_n\_n+1} = \frac{LP_{modified\_n+1} - LP_{modified\_n}}{SP_{max} - LP_{modified\_n}}.$$

In one example, a probe may send out 20 request packets, and receive 10 response packets from first node Node_n. Meanwhile, a probe may send out 20 packets, and receive 10 packets from Node_(n+1). Using the above equation, the edge packet loss between first node Node_n and second node Node_(n+1) may be zero.

In some embodiments, user equipment may measure packet loss at each of the two consecutive nodes, and may use the simplified approach to calculate the performance metrics. In certain embodiments, the edge packet loss calculation can be simplified when the packet loss is very low or very small. For example, when the packet loss is less than 5% of the sent packets, the simplified approach may be within 5% of the actual packet loss. The simplified packet loss for a very low loss may be represented by the following equation $$PL_{edge\_n\_n+1} = \frac{LP_{n+1} - LP_n}{SP}.$$

The packet loss calculated using the above equation may be close to the actual value when the lost packets at first node Node_n may be very low or very small. The simplified packet loss may in certain embodiments be smaller than the actual packet loss.

FIG. 3A illustrates an example of a table according to certain embodiments. In particular, FIG. 3A illustrates an example table that shows that the error of the simplified approach increases as the number of lost packets at node N increases. As can be seen in table 350, the number of sent packets are set to 20, while the number of lost packets in Node_n and Node_n+1 may be changed. As the number of lost packets at Node_n increases, the error of the simplified calculation also increases. On the other hand, as the number of lost packets at Node_n decreases, the error of the simplified calculation decreases. For example, when the number of lost packets at Node_n is 1, the error of simplified calculation may be 5%. When the number of lost packets at Node_n is 9, however, the error of simplified calculation may be 45%. In other words, as the number of lost packets at Node_n decreases, the simplified calculation becomes more accurate.

In a first example, first node Node_n has an SP_n equal to 8, and an LP_n equal to 4. Second node Node_(n+1), on the other hand, may have SP_(n+1) equal to 8, and LP_(n+1) equal to 6. The actual edge packet loss may be fifty percent, as calculated by (6−4)/(8−4). The simplified edge packet loss though may be twenty five percent, as calculated by (6−4)/8. Because the packet loss of the first example is not low, the simplified equation may not be close to the actual value. In a second example, first node Node_n has an SP_n equal to 16, and an LP_n is equal to 1. Second node Node_(n+1), on the other hand, may have an SP_(n+1) equal to 16, and LP_(n+1) is equal to 3. The actual edge packet loss may be 13.33% percent, as calculated by (3−1)/(16−1). The simplified edge packet loss though may be 12.5% percent, as calculated by (3−1)/16. Because the packet loss of the second example is low, the simplified equation may be close to the actual value.

Once the individual latencies at first node Node_n and second node Node_(n+1) are determined, the latency of the edge between first node Node_n and second node Node_(n+1) can be determined by subtracting the latency of second node Node_(n+1) minus the latency of first node Node_n. Once the edge performance metrics are determined, edge metrics across paths may be aggregated.

By using discovered multiple paths that contain the same edge, the edge metrics may be more accurate in determining the packet loss by aggregating those metrics or measurements. Packet loss aggregation may therefore be calculated using the following equation:

$$PL_{agg\_edge\_n\_n+1} = \frac{\text{SUM}(LP_{edge\_n\_n+1})}{\text{SUM}(SP_{edge\_n\_n+1})}.$$

Figure 4:
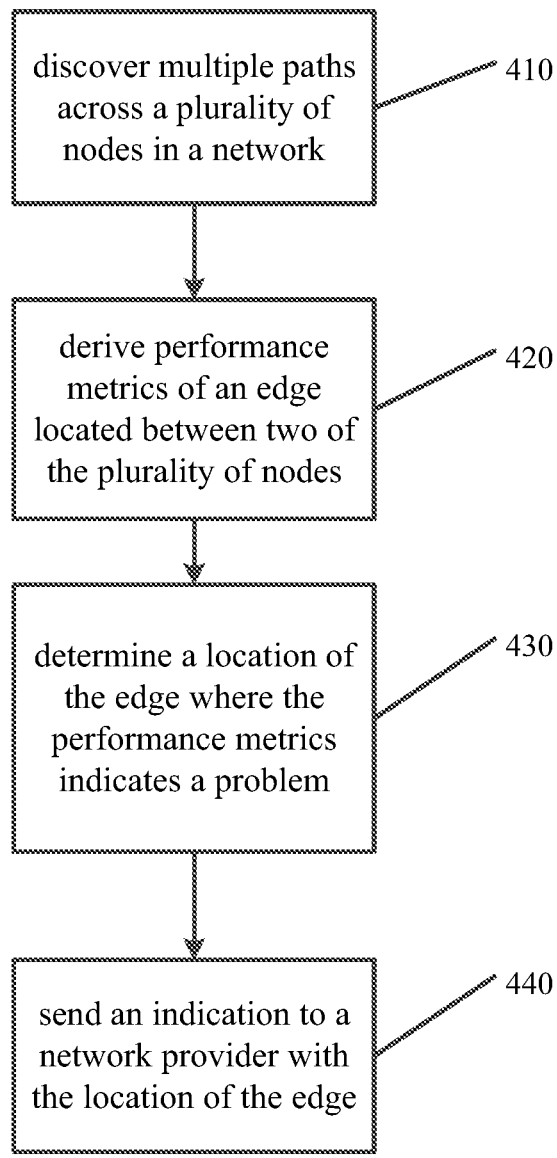
FIG. 4 illustrates a flow diagram according to certain embodiments.

FIG. 4 illustrates an example of a flow diagram of a method according to certain embodiments. In particular, FIG. 4 shows an embodiment of a probe located in or operated by a user equipment. In step 410, the user equipment may discover multiple paths across a plurality of nodes in a network between a user equipment and an endpoint. In certain embodiments, the performance metrics may smooth the collected performance metrics to account for packet losses and latency associated with a probing packet.

In step 420, the user equipment may derive at the user equipment performance metrics of an edge located between two of the plurality of nodes. The performance metrics may be derived based on performance of the two nodes bordering the edge. The two nodes are located within one of the multiple paths, and may be consecutive nodes within the one path. In other words, the performance metrics of an edge may be derived based on two nodes located on the same path. The path on which the two nodes are located may therefore be taken into consideration when deriving performance metrics. The user equipment may also calculate the performance metrics based on a first performance metric and a second performance metric of the edge, wherein the first performance metrics and the second performance metric are aggregated. In some embodiments, the number of sent probe packets used to calculate the first performance metrics and the second performance metrics may be different. The first performance metrics and the second performance metrics are calculated using a different number of sent probe packets.

In step 430, the user equipment may determine a location of the edge where the performance metrics indicates a problem with the edge. The user equipment may then send an indication to a network provider with the location of the edge, as shown in step 440. The location may be used to signal a problem with one of the two nodes bordering the edge. In certain embodiments, the method illustrated in FIG. 4 may be performed without the user equipment having administrative access to the network.

Figure 5:
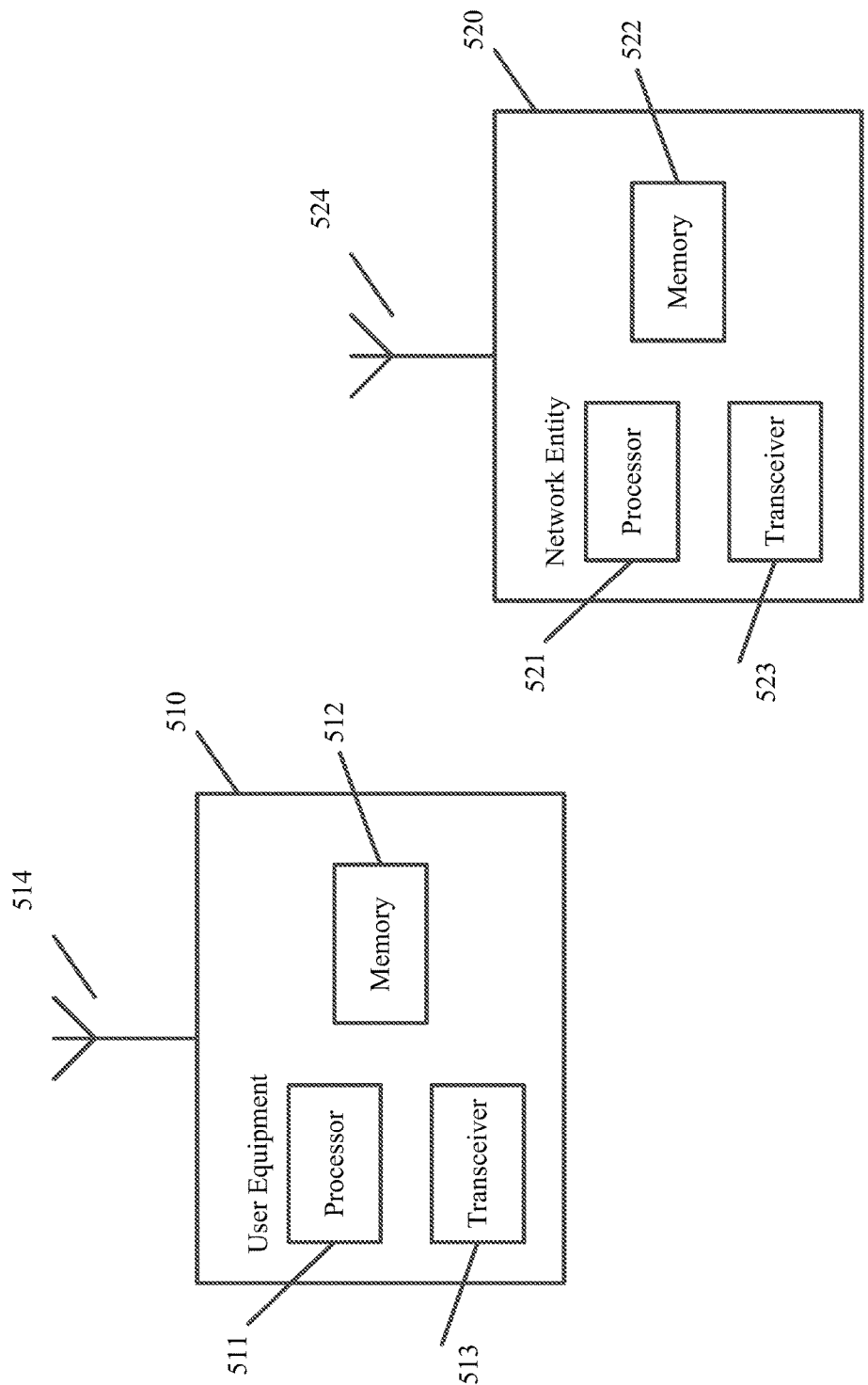
FIG. 5 illustrates a system according to certain embodiments.

FIG. 5 illustrates an example of a system according to certain embodiments. It should be understood that each signal or block in FIGS. 1, 2, 3, and 4 may be implemented by various means or their combinations, such as hardware, software, firmware, one or more processors and/or circuitry. In one embodiment, a system may include several devices, such as, for example, network entity 520 or user equipment 510. The system may include more than one user equipment 510 and more one network entity 520, although only one access node shown for the purposes of illustration. The network entity may be a router, a proxy server, a network node, a server, a host, a base station, or any of the other network node discussed herein. Network entity 520, may be a third party server that is not located in the traced paths.

Each of these devices may include at least one processor or control unit or module, respectively indicated as 511 and 521. At least one memory may be provided in each device, and indicated as 512 and 522, respectively. The memory may include computer program instructions or computer code contained therein. One or more transceiver 513 and 523 may be provided, and each device may also include an antenna, respectively illustrated as 514 and 524. Although only one antenna each is shown, many antennas and multiple antenna elements may be provided to each of the devices. Higher category user equipment generally include multiple antenna panels. Other configurations of these devices, for example, may be provided. For example, network entity 520 and user equipment 510 may be additionally or alternatively be configured for wired communication, in addition to wireless communication, and in such a case antennas 514 and 524 may illustrate any form of communication hardware, without being limited to merely an antenna.

Transceivers 513 and 523 may each, independently, be a transmitter, a receiver, or both a transmitter and a receiver, or a unit or device that may be configured both for transmission and reception. In other embodiments, the user equipment or the network entity may have at least one separate receiver or transmitter. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 510 may be a mobile station (MS) such as a mobile phone or smart phone or multimedia device, a computer, such as a tablet, personal computer, or a laptop computer, provided with wireless communication capabilities. User equipment 510 may also be personal data or digital assistant (PDA) provided with wireless communication capabilities, portable media player, digital camera, pocket video camera, navigation unit provided with wireless communication capabilities or any combinations thereof.

In some embodiments, an apparatus, such as a user equipment or a network entity may include means for carrying out embodiments described above in relation to FIGS. 1, 2, 3, and 4. In certain embodiments, at least one memory including computer program code can be configured to, with the at least one processor, cause the apparatus at least to perform any of the processes described herein.

Processors 511 and 521 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 520 or user equipment 510, to perform any of the processes described above (see, for example, FIGS. 1, 2, 3, and 4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

Furthermore, although FIG. 5 illustrates a system including a network entity 520 and user equipment 510, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The user equipment 510 may likewise be provided with a variety of configurations for communication other than communication network entity 520. For example, the user equipment 510 may be configured for device-to-device or machine to machine communication.

The above embodiments provide for improvements to the functioning of a network and/or to the functioning of the nodes or computers within the network, or the user equipment communicating with the network. Specifically, certain embodiments can provide for a simple and efficient apparatus, method, or process for detecting and locating a network node that is causing a performance issue in a network, even when a user equipment may not have administrative access to a network. Detecting the network node causing the performance issue may isolate the problem to a given edge, and two bordering nodes, while at least partially excluding influence on the performance by other nodes.

Once the location of the network node is detected, the location may be sent to a network provider, which may then be able to correct the issue.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Partial Glossary
PL packet loss
SP sent packets
LP loss packets
Node_n first node
Node_n+1 second node
TTL time to live
ICMP internet control message protocol
MPLS multiprotocol label switching

We claim:

1. A method comprising:
discovering, using a probe packet, multiple paths across a plurality of nodes in a network between a user equipment and an endpoint;
deriving, at the user equipment, performance metrics of an edge located between two of the plurality of nodes, wherein the performance metrics are derived based on performance of the two nodes bordering the edge, wherein the two nodes are located within one of the multiple paths;
determining a location of the edge where the performance metrics indicates a problem with the edge;
sending an indication to a network provider with the location of the edge, wherein the location is used to signal a problem with one of the two nodes bordering the edge;
calculating the performance metrics based on a first performance metric and a second performance metric of the edge, wherein the first performance metric and the second performance metric are aggregated; and
smoothing of the performance metrics to account for packet loss and latency associated with the probe packet, wherein the smoothing of the performance metrics comprises estimating the performance metrics of normal traffic as opposed to simulated traffic that includes the probe packet, and wherein the smoothing of the performance metrics comprises grouping at least two of the multiple paths that follow a same path to improve an accuracy of the estimation of the performance metrics,
wherein the endpoint packet loss of the paths is calculated using the following equation: PL=SUM(LP)/SUM(SP) wherein PL represents the packet loss, LP represents the number of packets that were sent to the endpoint and for which no response is received, and SP represents the number of probing packets sent to the endpoint.

2. The method according to claim 1, wherein the performance metrics comprise at least one of a packet loss or a latency at the two nodes.

3. The method according to claim 1, wherein the first performance metric and the second performance metric are calculated on a same edge of two different paths or the one path of the multiple discovered paths.

4. The method according to claim 1, wherein the first performance metrics and the second performance metrics are calculated using a different number of sent probe packets.

5. The method according to claim 1, wherein the two nodes are consecutive hops on a path.

6. The method according to claim 1, further comprising:
calculating an edge packet loss based on the packet loss at each of the two nodes.

7. The method according to claim 1, further comprising:
measuring an estimation error at each of the two nodes; and
using the estimation error to calculate the performance metrics.

8. The method according to claim 1, wherein a traceroute probe is used to determine the first path and the second path.

9. The method according to claim 1, wherein the multiple paths are discovered via tracerouting.

10. The method according to claim 1, wherein the user equipment does not have administrative access to the network.

11. An apparatus, comprising: at least one memory comprising computer program code; at least one processor;
wherein the at least one memory and the computer program code are configured, with the at least one processor, to cause the apparatus at least to:
discover, using a probe packet, multiple paths across a plurality of nodes in a network between the apparatus and an endpoint;
derive, at the apparatus, performance metrics of an edge located between two of the plurality of nodes, wherein the performance metrics are derived based on performance of the two nodes bordering the edge, wherein the two nodes are located within one of the multiple paths;
determine a location of the edge where the performance metrics indicates a problem with the edge between the two nodes;
send an indication to a network provider with the location of the edge, wherein the location is used to signal a problem with one of the two nodes bordering the edge;
calculate the performance metrics based on a first performance metric and a second performance metric of the edge, wherein the first performance metric and the second performance metric are aggregated; and
smooth the performance metrics to account for packet loss and latency associated with a probing packet, wherein the smoothing of the performance metrics comprises estimating, the performance metrics of normal traffic as opposed to simulated traffic that includes the probing packet, and wherein the smoothing of the performance metrics comprises grouping at least two of the multiple paths that follow a same path to improve an accuracy of the estimation of the performance metrics, wherein the endpoint packet loss of the paths is calculated using the following equation: PL=SUM(LP)/SUM(SP) wherein PL represents the packet loss, LP represents the number of packets that were sent to the endpoint and for which no response is received, and SP represents the number of probing packets sent to the endpoint.

12. The apparatus according to claim 11, wherein the performance metrics comprise at least one of a packet loss or a latency at the two nodes.

13. The apparatus according to claim 11, wherein the first performance metric and the second performance metric are calculated on a same edge of two different paths or the one path of the multiple discovered paths.

14. The apparatus according to claim 11, wherein the first performance metrics and the second performance metrics are calculated using a different number of sent probe packets.

15. The apparatus according to claim 11, wherein the at least one memory and the computer program code are configured, with the at least one processor, to cause the apparatus at least to:
measure an estimation error at each of the two nodes; and
use the estimation error to calculate the performance metrics.

16. The method according to claim 11, wherein the user equipment does not have administrative access to the network.

17. A non-transitory computer-readable medium encoding instructions that, when executed in hardware, perform a process, comprising:

discovering, using a probe packet, multiple paths across a plurality of nodes in a network between a user equipment and an endpoint;

deriving, at the user equipment, performance metrics of an edge located between two of the plurality of nodes, wherein the performance metrics are derived based on performance of the two nodes bordering the edge, wherein the two nodes are located within one of the multiple paths;

determining a location of the edge where the performance metrics indicates a problem with the edge;

sending an indication to a network provider with the location of the edge, wherein the location is used to signal a problem with one of the two nodes bordering the edge;

calculating the performance metrics based on a first performance metric and a second performance metric of the edge, wherein the first performance metric and the second performance metric are aggregated; and smoothing of the performance metrics to account for packet loss and latency associated with a probing packet, wherein the smoothing comprises estimating the performance metrics of normal traffic as opposed to simulated traffic that includes the probing packet, and wherein the smoothing of the performance metrics comprises grouping at least two of the multiple paths that follow a same path to improve an accuracy of the estimation of the performance metrics, wherein the endpoint packet loss of the paths is calculated using the following equation: PL=SUM(LP)/SUM(SP) wherein PL represents the packet loss, LP represents the number of packets that were sent to the endpoint and for which no response is received, and SP represents the number of probing packets sent to the endpoint.

* * * * *